United States Patent [19]
Allard

[11] Patent Number: 5,193,846
[45] Date of Patent: Mar. 16, 1993

[54] AIR BAG CLAMPING DEVICE

[75] Inventor: John E. Allard, North Ogden, Utah

[73] Assignee: Morton International, Inc., Chicago, Ill.

[21] Appl. No.: 769,032

[22] Filed: Sep. 30, 1991

[51] Int. Cl.⁵ .............................................. B60R 21/16
[52] U.S. Cl. ........................................................ 280/728
[58] Field of Search ............... 280/741, 730, 731, 732, 280/743, 728, 736; 403/373, 408.1

[56] References Cited

U.S. PATENT DOCUMENTS

| | | | |
|---|---|---|---|
| 4,183,550 | 1/1980 | Sudou | 280/743 |
| 4,793,631 | 12/1988 | Takada | 280/743 |
| 4,902,036 | 2/1990 | Zander et al. | 280/743 |

FOREIGN PATENT DOCUMENTS

| | | | |
|---|---|---|---|
| 3604843 | 8/1987 | Fed. Rep. of Germany | 280/736 |
| 0164640 | 6/1990 | Japan | 280/736 |
| 0148346 | 6/1991 | Japan | 280/736 |

Primary Examiner—Tamara L. Graysay
Attorney, Agent, or Firm—Mark F. LaMarre; Gerald K. White

[57] ABSTRACT

A clamping device for clamping an automotive air bag to an air bag inflator. The clamping device includes an annular ring and a module housing wherein walls are attached perpendicular to the bodies of the clamping members at their inflator-side boundaries. When the periphery of the gas inlet opening is placed between the walls and the bodies of the clamping members the air bag is held in place by both radial and axial clamping thus securing the air bag during deployment. Undersized fastener openings in the module housing in conjunction with radial clamping provide clamping of the air bag during assembly of the air bag module without installation and securing of the inflator.

8 Claims, 2 Drawing Sheets

AIR BAG CLAMPING DEVICE

BACKGROUND OF THE INVENTION

1. Field of the Invention

This invention relates to an inflatable type occupant restraint system, or as it is commonly known an air bag restraint system. Such a system may be installed in an automobile or other vehicle, at least in part on the steering wheel for the protection of the driver and also on the dashboard for passenger protection in the event of a collision. More particularly, this invention relates to an improvement in the means for holding the air bag in such a device.

2. Description of Related Art

During the manufacture of an air bag restraint system numerous components must be installed and checked to produce the finished air bag module. Among the components of the air bag module are the cover, air bag, air bag holder means (annular retainer, module housing, and fasteners), gas generator or inflator, ignition element, and a means to attach the assembly to the body of the automobile. The inflator due to the presence of the gas generant, a pyrotechnic, is the most sensitive component. For safety reasons it is desirable to delay installation of the inflator to as late as possible in the assembly process.

In a vehicle equipped with an air bag safety system, the air bag is instantly inflated in the event of a collision to protect the occupant from injury. The air bag is inflated by the pressure of a gas supplied from an inflator fixed or mounted to the steering wheel, dashboard or other appropriate part of the body of the automobile.

It has been determined that in order to protect a driver during a collision of an automobile the air bag should be inflated within 20 to 40 milliseconds after the initial impact. The high pressure gas, supplied to the air bag, necessary to inflate the air bag within the short period of time required produces forces which tend to pull and separate the air bag from its mounting. In addition, the impact of the occupant against the inflated air bag tends to increase these forces. To resist these strong forces a mounting device of considerable strength must be provided to insure the safety of the occupant.

In a conventional mounting for an air bag, the peripheral region around the outer circumference of the gas inlet opening into the air bag is clamped between a module housing provided around the gas discharge or exit opening and an annular retainer secured to the module housing. The module housing is mounted to the vehicle body, for example, the steering wheel. The annular retainer is bolted or riveted to the module housing.

In another conventional mounting arrangement the air bag is riveted to the annular retainer. The annular retainer with the air bag affixed thereto is then bolted to the module housing and the inflator. The use of rivets to attach the air bag is a major cause of reworking of the inflator module assembly due to the necessity of replacing broken or unfastened rivets. Reworking of the inflator module is not always possible. In these situations the defective modules must be discarded, resulting in lost production and increased cost of manufacturing. The elimination of rivets in the manufacture of the air bag module assembly would eliminate a major cause for reworking and disposal of defective inflator modules.

In the event of a collision, the large forces produced by the inflation of the bag and the impact of the body of the occupant against the bag tend to pull the clamped portion of the bag from the inflator. The force holding the air bag to the inflator is not evenly distributed over the entire area of the abutment between the annular retainer and the clamped portion of the air bag. Instead, the force of holding the air bag to the inflator is concentrated in the shearing resistance of that part of an air bag which has a width corresponding to the diameter of the fastener and a length corresponding to the distance from the fastener to the edge of the gas inlet opening of the air bag. This clamping action of the retainers may be insufficient to prevent separation of the bag from the retainers. Such separation would permit the escape of gas directly into the passenger compartment of the vehicle endangering the safety of the driver and other occupants of the vehicle.

Numerous solutions have been suggested to improve the clamping of the air bag and to increase the shear strength of the air bag between the fastener and the inner edge of the gas inlet opening. An undersized air bag opening which thereby increases the length of bag available to resist the shear stress upon deployment of the air bag is disclosed by Sudou, U.S. Pat. No. 4,183,550. The additional section of the air bag between the annular retainer and the edge of the bag opening is placed between the inner edge of the annular retainer and the inflator housing. This arrangement like previous clamping devices relies on the shear strength of the air bag which lies radially inward from the fastener to overcome the deployment forces. To facilitate the installation of the undersized bag opening between the clamps and the inflator housing the bag must be slit in a number of locations, thereby weakening the air bag by eliminating the circumferential strength at the air bag gas inlet opening.

The use of a chain-stitched stitch at the air bag gas inlet opening to resist the deployment forces applied to the bag is disclosed by Takada, U.S. Pat. No. 4,793,611. This arrangement permits movement of the bag to align the edge of the gas opening against the inner edge of the annular retainer and mounting bracket. As with other state of the art clamping systems this arrangement relies primarily on the shear strength of the bag in proximity to the fasteners.

SUMMARY OF THE INVENTION

An object of this invention is to provide a means of clamping an air bag during assembly of an air bag module (air bag, inflator, mounting bracket, and cosmetic cover) without permanently securing the fastener means.

Another object of this invention is to provide an automotive air bag safety restraint module the component parts of which are so arranged as to allow the installation of the inflator at the final step in the assembly of the module and installation thereof in the vehicle.

Another object of this invention is to eliminate the need for rivets to attach the air bag to the annular retainer.

Another object of this invention is to provide improved clamping over the entire periphery of the air bag opening. Also, it is a purpose of this invention to provide improved clamping at the air bag opening during deployment of the air bag.

These and other objectives of the invention, which will become apparent from the following description, have been achieved by a novel clamping device for holding an air bag on to an inflator housing which is substantially circular in traverse cross section. The air bag is clamped around the periphery of bag's gas inlet opening by a clamping device which includes an annular retainer or retainer ring and a module housing.

The annular retainer or retainer ring has an inner boundary, a body, and an outer boundary, with a plurality of first holes passing through the body of the annular retainer. A wall substantially perpendicular to the body of the annular retainer is attached to or integral with the ring's inner boundary (hereinafter referred to as a first wall). Optionally, a wall substantially perpendicular to the body of the ring is attached to or integral with the ring's outer boundary (hereinafter referred to as outside wall). The clamping device also includes a module housing having a body, a substantially circular inner boundary (hereinafter referred to as an inflator-side edge), a plurality of second holes radially outward of the inflator-side edge passing through the body thereof, and an outer boundary or mounting edge. A wall substantially perpendicular to the body of the module housing is attached to or integral with the inflator-side edge (hereinafter referred to as a second wall), such wall conforms to the inflator-side wall of the annular retainer. Optionally, the second holes can be undersized, that is the diameter of the second holes is less than the diameter of fastener means passing through the second holes.

The air bag which is to be held to the inflator housing has a substantially circular gas inlet opening in a generally central region thereof, with the diameter of the gas inlet opening of the air bag being less than the diameter of the inflator to which the air bag is to be attached, and a plurality of fastener holes radially outward of such gas inlet opening. Thus, the inner edge portion of the air bag extending radially outward surrounding the gas inlet opening is placed between the first wall of the retainer ring and the second wall of the module housing. The gap formed between the first wall of the retainer ring and the second wall of the module housing is less than the thickness of the fabric of the air bag. As a consequence the inner edge of the bag is compressed between the inflator-side walls of the annular retainer and module housing. Extending radially outward from the gas inlet opening of the air bag the bag is further clamped between the bodies of the retainer ring and the module housing. Fastener means are passed through the first, fastener, and second holes to join the retainer ring, air bag, and module housing.

The clamping device, through radial clamping in conjunction with optional undersized second hole in the module housing, holds the air bag during assembly of air bag module without otherwise securing the fastener. Further, through the radial clamping the air bag is held more securely during deployment of the air bag due to clamping around the entire periphery of gas inlet opening of the air bag as opposed to clamping only in the proximity of the fastener means. By radial clamping is meant herein clamping around the periphery of the gas inlet opening of the air bag perpendicular to the central axis of the inflator.

The various features of novelty that characterize the invention are pointed out with particularity in the claims that are annexed to and form a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this description of the invention, a detailed description follows with reference being made to the accompanying figures of drawing which form part of the specification, in which like parts are designated by the same reference numbers, and of which.

DETAILED DESCRIPTION OF THE INVENTION

Figure 1:
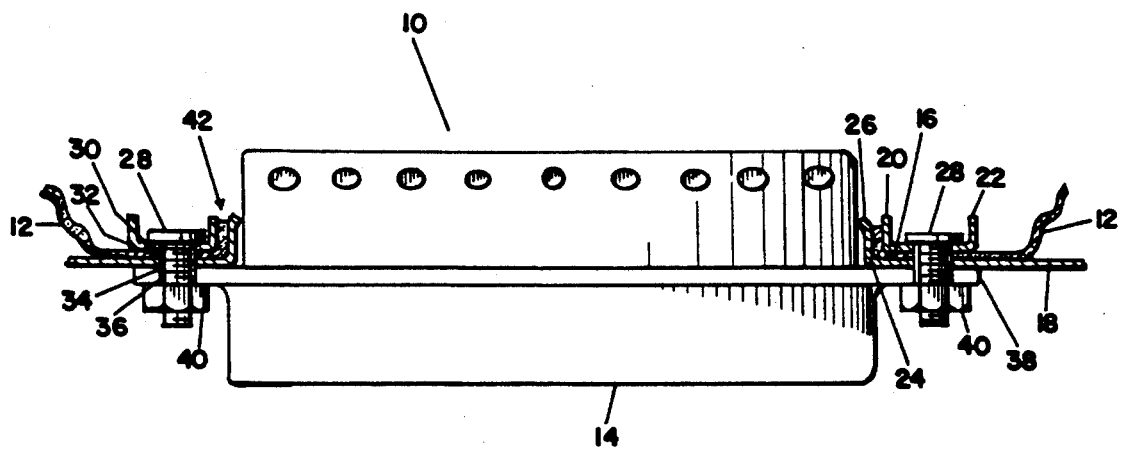
FIG. 1 is a cross sectional view of the clamping assembly and illustrates the clamping of the air bag by the annular retainer and the module housing and the attachment of the inflator.

As best seen in FIG. 1, a clamping device shown generally at 10 for clamping an air bag 12 to an inflator 14, comprises an annular retainer or retainer ring 16 and a module housing 18. The retainer ring 16 has a side wall 20 (hereinafter first wall) positioned adjacent to the inflator 14 at the inner boundary of the retainer ring 16 and optionally an outside wall 22 at the outer boundary of the ring, with both walls 20 and 22 being disposed substantially perpendicular to the body of the retainer ring 16. The module housing 18 has a side wall 24 positioned adjacent to the inflator 14 (hereinafter second wall) at the inner boundary of the module housing, with wall 24 being disposed substantially perpendicular to the base of the module housing 18. The module housing second wall 24 conforms to the shape of the retainer ring first wall 20. Optionally, a radially inwardly curled edge 26 is formed on the second wall 24, being curled inwardly toward the inflator 14. A fastener 28 passes through an annular retainer fastener opening or hole 30 (hereinafter termed first hole), air bag fastener opening or hole 32, a module housing fastener opening or hole 34 (hereinafter termed second hole), and an opening or hole 36 in a flange 38 provided on inflator 14, terminating with a nut 40 or the like.

The air bag 12 is clamped around the peripheral region of a central circular gas inlet opening of the air bag 12 by radial clamping between the retainer ring first wall 20 and the housing module second wall 24. The gap 42 formed by the two inflator-side walls 20 and 24 is less than the thickness of the fabric of which the air bag is made.

Figure 2:
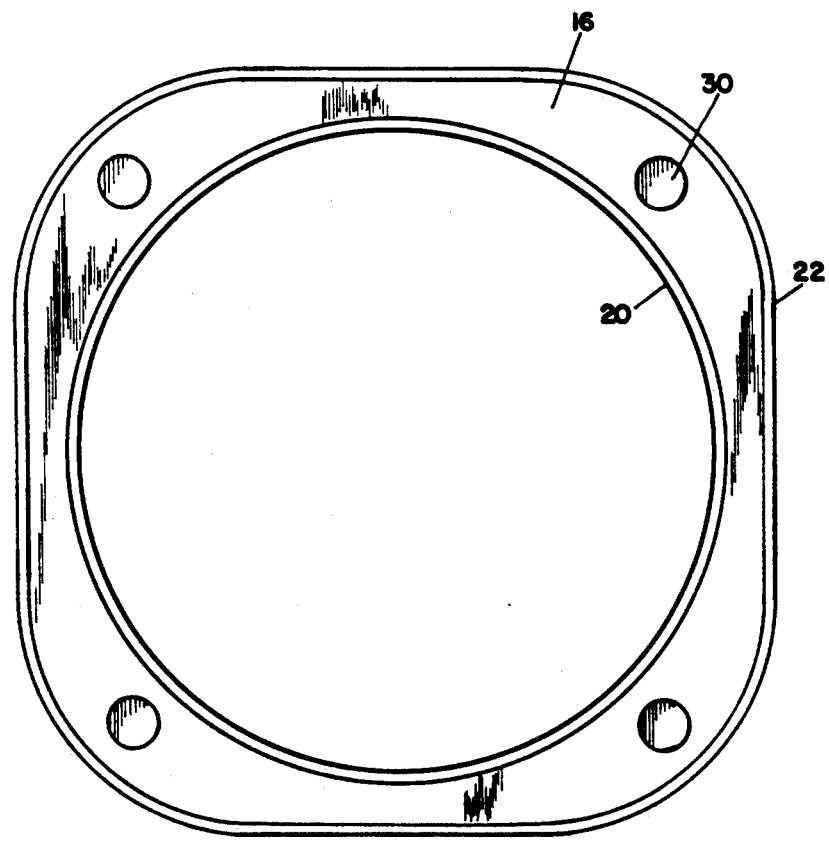
FIG. 2 is a top plan view of the annular retainer illustrating the fastener holes.

The annular retainer 16, as best seen in FIG. 2, has a substantially circular inner boundary and a generally rectangular exterior boundary with a first wall 20 closest to the inflator, a plurality of first holes 30 passing through the body of the annular retainer, and optionally an outside wall 22 around the outer boundary of the annular retainer 16, with both walls 20 and 22 being disposed substantially perpendicular to the base of the retainer ring 16. The retainer ring 16 can be made out of any suitable metal, such as aluminum or steel, with steel being preferred for strength and rigidity. The retainer ring can be manufactured by welding the walls 20 and 22 to the base or preferably by stamping and forming the retainer ring 16 out of a single piece of metal to produce a stronger retainer ring 16 using less metal.

Figure 3:
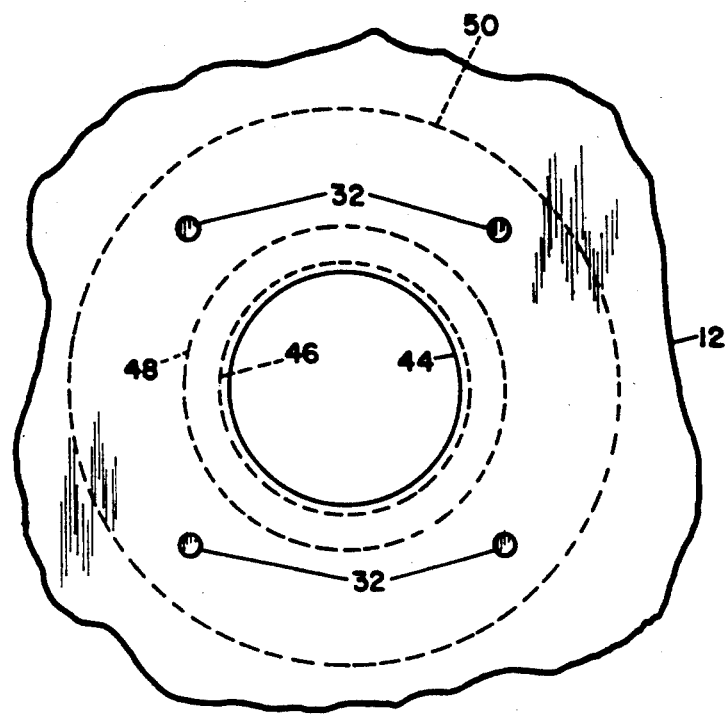
FIG. 3 is a fragmented bottom plan view of the air bag illustrating the central opening and the fastener holes.

As best seen in FIG. 3, the air bag 12 has a substantially circular gas inlet opening in a generally central region thereof defined by gas inlet opening boundary 44. The diameter of the gas inlet opening is less than the diameter of the gas generator, shown as 46, to be inserted through the opening. Radially outward of the gas inlet opening boundary 44 are fastener openings 32. The area of the air bag 12 adjacent to the gas inlet opening and radially inward of retainer ring inner boundary 48 is clamped between retainer ring first wall 20 and module housing second wall 24 by radial clamping. The area of the air bag between the retainer ring inner boundary shown at 48 and the retainer ring outer boundary shown at 50 is clamped between the retainer ring 16 and the module housing 18 by axial clamping.

Figure 4:
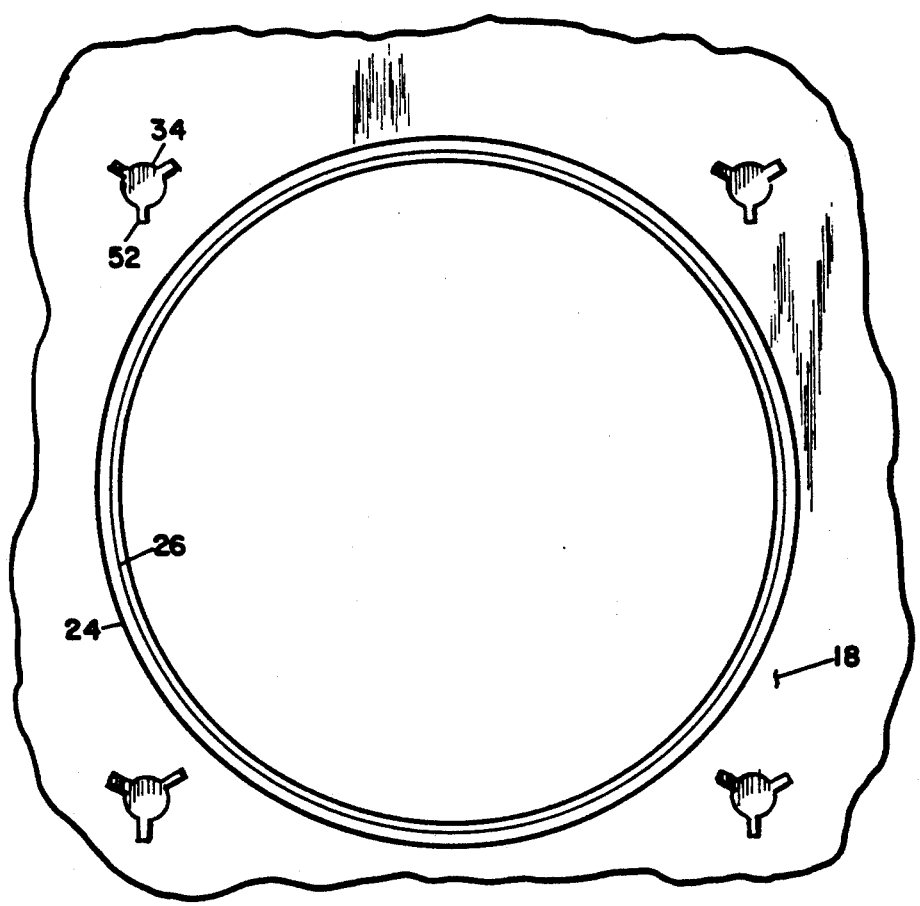
FIG. 4 is a fragmented top plan view of the module housing illustrating the undersized bolt fastener holes.

The module housing 18 is held in place during assembly of the air bag module by undersized module housing fastener openings 34, as shown in FIG. 4, which grip the walls of the fasteners 28. Notches 52 cut radially outward around the circumference of the openings 34 reduce the circumferential strength at the opening thus permitting the edges of the hole 34 to deform and engage the wall of the fastener when the module housing is pressed in place. Thus the bag is held firmly between the annular retainer and the module housing during assembly of the remainder of the module assembly without the need for further closure means such as nuts 40 or the like. Circumferential strength of the edges of the openings 34 can also be reduced by beveling or tapering the metal around the periphery of the opening 34.

Fasteners 28 are inserted from the wall side of the annular retainer 16 through the openings 30. Rivets or bolts can be used with clinch fit bolts pressed into place in the annular retainer 16 being preferred. The annular retainer 16 is then inserted through the gas inlet opening in the air bag 12 with the wall side of the retainer ring 16 facing inwardly of the bag. The fasteners 28 are inserted through the fastener holes 32 that are provided in the air bag, as shown in FIG. 3. The peripheral area of the air bag near the gas inlet opening is placed around the inflator side of the first wall 20 of the annular retainer 16, as seen in FIG. 1. The module housing 18 is then placed over the outside the air bag gas inlet opening with the inflator-side wall of the module housing 24 and the inflator-side wall of the annular retainer 22 clamping a region of the air bag 12 adjacent to the inner edge thereof. To prevent the escape of gas and to reinforce the bag edge, a sealant or caulking can be applied between the interfacing surfaces.

With the air bag 12 clamped between the the annular retainer 16 and the module housing 18 the air bag module is assembled without attachment of the inflator 14. The air bag 12 can be folded and the assembly mounted on a steering wheel. After the assembly is complete, except for the inflator 14, the inflator 14 is inserted through a central opening in the module housing 18 thus engaging the module housing inflator-side wall inwardly curled edge 26 and secured by attaching nuts 40 or the like. In accordance with the invention, this may comprise the final step in the installation of the air bag module assembly in an automobile or other vehicle. Although the invention has been described in an application in which the inflatable air bag is mounted to a steering wheel, those skilled in the art will understand that the air bag module assembly can be mounted to the dashboard or some other part of the body of the vehicle.

In the operation of the air bag restraint system, the impact upon a crash or collision is detected by a sensor (not shown) which ignites gas generant provided in the inflator 14. The inflator 14 discharges inflating gas into the air bag 12 to effect rapid inflation thereof, breaking away a cover (not shown) so that the bag can expand over the region between the steering wheel and the driver of the vehicle and thus absorb the impact on the latter. At this time the clamped portion of the air bag 12 is subjected to high radial forces which tend to pull the air bag 12 from the mounted position thereof. However, the engagement of the air bag gas inlet opening by radial clamping provided by the inflator-side walls of the annular retainer 16 and the module housing 18 act in opposition to those forces and retains the air bag 12 firmly in place, thus preventing gas leakage and assuring the protection of the driver.

It is believed that during deployment of the air bag forces are exerted perpendicular to the axis of the inflator and in line with the section of the air bag 12 clamped between the body of the annular retainer 16 and housing module 18. In addition, forces are exerted parallel to the axis of the inflator along the outer edge of the annular retainer 16. These forces parallel to the axis of the inflator are exerted on the outer edge of the rigid annular retainer 16 tending to separate it from the air bag 12 and module housing 18. The force on the outer edge of the annular retainer 16 produces a levering action with the axes of the fasteners 28 acting as a fulcrum thus forcing the inflator edge of the annular retainer 16 toward the inflator-side wall 24 of the module housing, thereby clamping the air bag more firmly. Due to the inflator-side walls this clamping action is accentuated along the plane of maximum force, the end of the lever. The module housing inflator-side wall 24 contacting the inflator 14 through the inflator-side wall inwardly curled edge 26 strengthens the module housing inflator-side wall increasing its rigidity.

Thus, in accordance with the invention, there has been provided a means of clamping an air bag during assembly of an air bag module without permanently securing the fastener means prior to installation of the inflator. There has also been provided an automotive air bag safety restraint module the component parts of which are so arranged as to allow installation of the inflator as the final step in the assembly of the module and the installation thereof in the vehicle. Additionally, there has been provided improved clamping of the air bag gas inlet opening during deployment of the air bag.

With this description of the invention in detail, those skilled in the art will appreciate that modifications may be made to the invention without departing from the spirit thereof. Therefore, it is not intended that the scope of the invention be limited to the specific embodiments that have been illustrated and described. Rather, it is intended that the scope to the invention be determined by the scope of the appended claims.

I claim:

1. A clamping device for holding an air bag onto an air bag inflator that is substantially circular in traverse cross section, comprising:

an annular retainer having an inner boundary, a body, an outer boundary with a plurality of first holes passing through the body of the annular retainer, and a first wall integral to said inner boundary edge of said annular retainer, said first wall being substantially perpendicular to said body of said annular retainer;

a module housing having a mounting edge, a body, and an inflator-side edge with a plurality of second holes passing though the body of said module housing, and a second wall having a top and a bottom edge wherein said bottom edge is attached to said inflator-side edge of said module housing, said second wall being substantially perpendicular to said module housing and conforming to said first wall of said annular retainer such that a gap is formed;

an air bag having a substantially circular opening in a central region thereof and fastener holes radially outwardly of said opening wherein the diameter of the opening of the air bag is less than the outer diameter of the air bag inflator on which the air bag is to be held, an inner edge portion of the bag surrounding said opening extending radially inwardly from said annular retainer when assembled thereto, and wherein the inwardly extending inner edge portion of said air bag surrounding said opening is placed between said first wall of said annular retainer and said second wall of said housing module, wherein said gap formed by said. first wall of said annular retainer and said second wall of said module housing is less than the thickness of the fabric of which said air bag is made such that an inner edge portion of said air bag is compressed between said first wall of said annular retainer and said second wall of said module housing; and a fastener means passed through said first, fastener and second holes to join said annular retainer, said air bag, and said module housing.

2. A device as specified in claim 1 wherein a third wall integral to said outer boundary of said annular retainer said wall being substantially perpendicular to said body of said annular retainer.

3. A device as specified in claim 1 wherein said top edge of said module housing second wall is in the form of a radially inwardly curled edge.

4. A device as specified in claim 1 wherein said second holes in said module housing are undersized whereby said fastener means engage the edges of said second holes to hold said annular retainer and said air bag to said module housing.

5. A device as specified in claim 4 wherein each of said undersized holes in said module housing is provided with a plurality of circumferentially spaced substantially radially outwardly extending notches from said undersized fastener holes.

6. A clamping device for holding an air bag onto an air bag inflator that is substantially circular in traverse cross section, comprising:

an annular retainer having an inner boundary, a body, an outer boundary with a plurality of first holes passing through said body, and first wall attached to said inflator edge, said first wall being substantially perpendicular to said body of said annular retainer;

a module housing having an inner boundary, a substantially circular opening defined by said inner boundary, a mounting edge, a second wall having a top and a bottom edge wherein said bottom edge is attached to said inner boundary of said module housing, said second wall being substantially perpendicular to said module housing and conforming to said first wall of said annular retainer, and a plurality of fastener holes passing through said module housing radially outwardly of said circular opening wherein the diameter of each of said holes is less than the diameter of said fastener to be inserted through each said fastener hole and wherein said module housing fastener holes have a plurality of circumferentially spaced substantially radially extending notches therein which extend outwardly from said fastener hole; and an air bag having an opening in a central region thereof and fastener holes positioned radially outwardly of said opening, with the diameter of said opening of said said air bag being less than the outer diameter of said air bag inflator to which air bag is to be held, said inner peripheral region of said air bag surrounding said opening being placed between said first wall of said annular retainer and said second wall of said housing module, wherein the gap formed by said first wall of said annular retainer and said second wall of said module housing is less than said thickness of the fabric of which said air bag is made such that said inner peripheral region surrounding said opening of said air bag is compressed between said first wall of said annular retainer and said second wall of said module housing; and a fastener passed through said first, fastener, and second holes to join said annular retainer, said air bag, and said module housing.

7. A device as specified in claim 6 wherein a third wall is attached to said outer edge of said annular retainer said third wall being substantially perpendicular to said body of said annular retainer.

8. A device as specified in claim 6 wherein said top edge of said module housing second wall is in the form of a radially inwardly curled edge.

* * * * *

UNITED STATES PATENT AND TRADEMARK OFFICE
CERTIFICATE OF CORRECTION

PATENT NO. : 5,193,846

DATED : March 16, 1993

INVENTOR(S) : Allard

It is certified that error appears in the above-identified patent and that said Letters Patent is hereby corrected as shown below:

At column 7, line 24, "said. first" should be -- said first --.

At column 8, line 30, "said said air bag" should be -- said air bag --.

Signed and Sealed this

Twenty-ninth Day of March, 1994

Attest:

BRUCE LEHMAN

Attesting Officer

Commissioner of Patents and Trademarks